US005979052A

United States Patent [19]

Horrie et al.

[11] Patent Number: 5,979,052

[45] Date of Patent: Nov. 9, 1999

[54] ENGINE INJECTOR STRUCTURE AND HARD THREAD MILLING METHOD AND APPARATUS FOR FORMING SAME

[75] Inventors: Gerald A. Horrie, South Wilmington; John E. Myers, Pontiac, both of Ill.

[73] Assignee: Caterpillar Inc., Peoria, Ill.

[21] Appl. No.: 08/924,235

[22] Filed: Sep. 5, 1997

[51] Int. Cl.[6] .............................. B23P 13/00; B23P 15/00

[52] U.S. Cl. .................. 29/890.126; 29/557; 29/890.132

[58] Field of Search ...................... 29/557, 558, 890.126, 29/890.132

[56] References Cited

U.S. PATENT DOCUMENTS

| | | | |
|---|---|---|---|
| 3,704,648 | 12/1972 | Burfoot . | |
| 4,156,307 | 5/1979 | Haught et al. | 29/428 |
| 4,163,402 | 8/1979 | Bykhovsky et al. | 82/1 C |
| 4,442,182 | 4/1984 | Chart | 428/654 |
| 4,629,518 | 12/1986 | Larsen . | |
| 4,666,350 | 5/1987 | Nicholas | 408/82 |
| 4,784,537 | 11/1988 | Baker . | |
| 4,882,812 | 11/1989 | Fetzer et al. . | |
| 4,913,604 | 4/1990 | Zaengerle . | |
| 5,205,466 | 4/1993 | Ker . | |
| 5,427,741 | 6/1995 | Bennett | 422/102 |
| 5,433,100 | 7/1995 | Easterbrook et al. | 72/391.2 |
| 5,500,058 | 3/1996 | Hirakawa et al. . | |
| 5,575,064 | 11/1996 | Fujiwara et al. . | |
| 5,603,784 | 2/1997 | Bay . | |

*Primary Examiner*—S. Thomas Hughes
*Assistant Examiner*—John Preta
*Attorney, Agent, or Firm*—Gordon H. Telfer

[57] ABSTRACT

Hard thread milling methods and equipment provide more precise alignment for a threadably retained component A fuel injector body with a cavity for a solenoid valve is processed by steps including heat treatment before milling threads and also milling a planar seal face to which the threads are located in precise perpendicularly so a high pressure fuel line can be reliably sealed.

9 Claims, 1 Drawing Sheet

29 14 40 27 10 42 44 28 26 12 22 24 23 20 30 32 31 16a 16 18 38 19 17 34 36

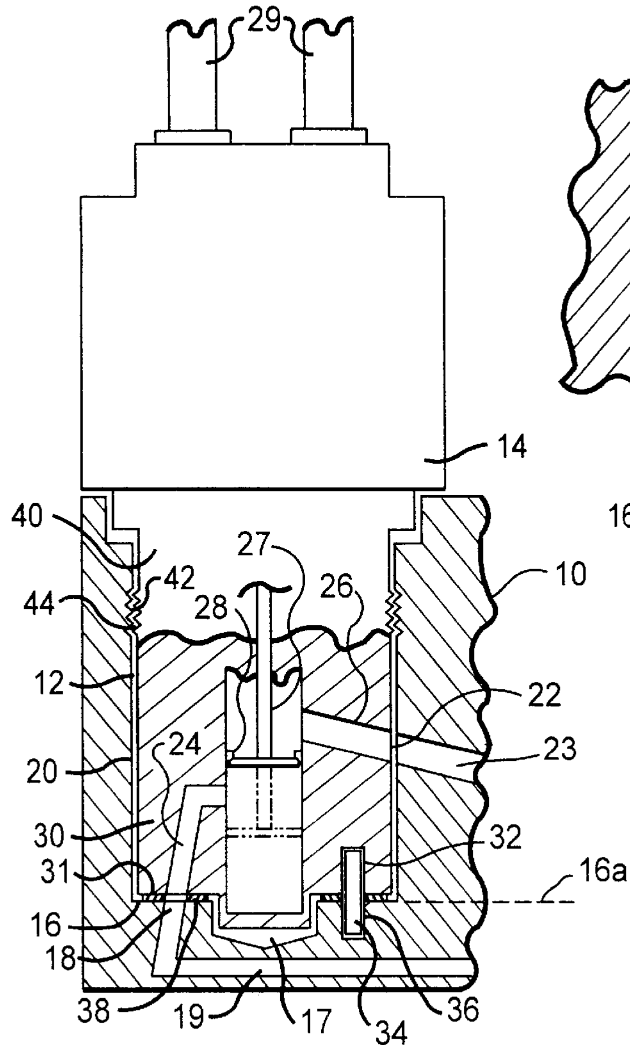
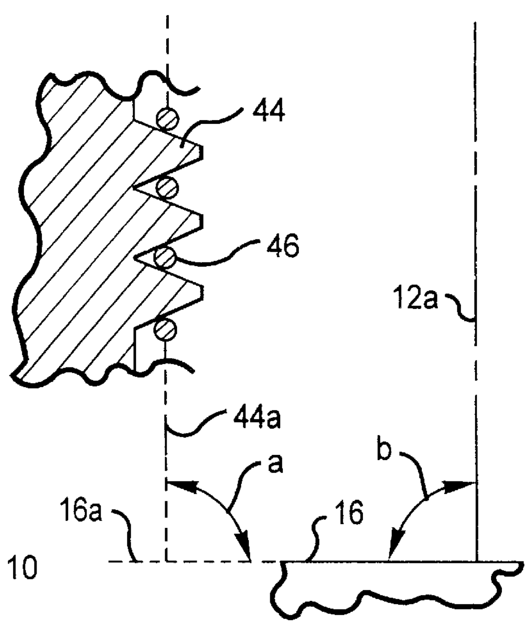
Fig. - 3 -
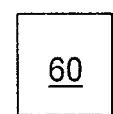
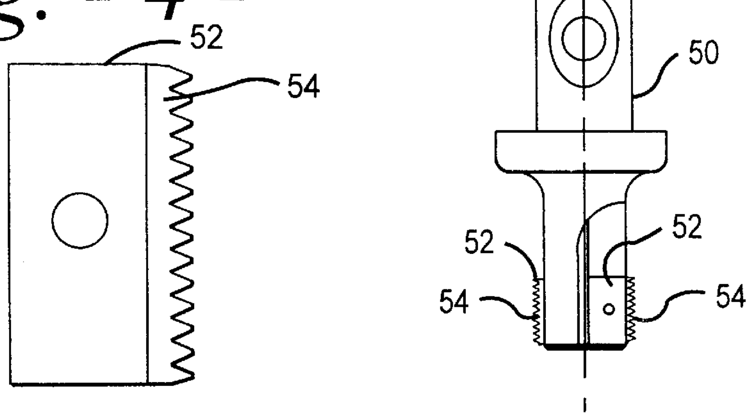

ENGINE INJECTOR STRUCTURE AND HARD THREAD MILLING METHOD AND APPARATUS FOR FORMING SAME

TECHNICAL FIELD

This invention relates to the manufacture of improved bodies for securing components in precise perpendicular location to a particular surface, and, more particularly, to a method and apparatus for providing such bodies with threads to threadably retain such components. The invention has particular applicability to engine injector valve housings.

BACKGROUND OF THE INVENTION

Machinery such as diesel engines and their fuel systems have numerous components to be assembled with important locational requirements. Some engines have electronically controlled fuel injection systems that include a solenoid valve threadably secured in a cartridge cavity of a body.

Such a valve is for controlling fuel flow between two lines of respective high and low pressure with diesel fuel pulses at pressures extending to high levels such as about 20,000 pounds per square inch. Sealing of the valve in the cartridge cavity is important to maintain the required pressure difference. When such a valve is closed, high pressure fluid will seek any available avenue of escape circumventing the blocked flow path through the valve, including between the valve and the cavity wall. Characteristically, the cartridge cavity has a high pressure port in its bottom surface and a low pressure port in its longitudinal surface which is generally cylindrical. Fluid communication between those ports should occur only through the valve.

The practice has been to process a metal (e.g., alloy steel), forged, body for housing such a valve in a sequence of steps including: machining, by milling, internal threads on the cavity wall for securing the valve while the body is in its soft condition before heat treatment; heat treating the body, with the threads, to a desired degree of hardness; and, after the heat treatment, machining a precise seal face at the bottom of the cavity. The valve is to be placed in position with the high and low pressure ports of the cavity communicating with ports in the valve itself. Then, external threads on the valve are secured to the internal threads of the cartridge cavity. The valve has a surface for fitting against the seal face of the cavity, normally with a metal seal gasket therebetween. However if the valve is tilted in the cartridge cavity, even by a few degrees, adequate sealing can be lost. Placing, and maintaining, the valve with its center line in precise perpendicular position in relation to the seal face in the cavity is what is intended.

When threads are milled in steel before heat treatment, they can be formed quickly, economically and accurately by standard milling equipment. Subsequent heat treatment can, however, deform the threads to an extent that the alignment of the solenoid valve is thrown off of perpendicularity. Grinding or polishing the previously milled threads, after the heat treatment, may be needed to provide adequately aligned threads. On close inspection, the surfaces of the threads will show heat treat residue or scale and metal to metal galling.

SUMMARY OF THE INVENTION

The invention provides techniques for improving perpendicularity of the threads in relation to the seal face in bodies for injector valves of the type described in the background, above. Such techniques can be applied in any metal bodies where internal threads are to be precisely aligned.

According to a method of the invention, the basic sequence of steps for making the body with the internal threads is one in which the body is heat treated prior to machining any threads. After the heat treatment, machining both the planar seal face at the end of the cartridge cavity and the threads on the longitudinal cavity surface is performed. The threads are accurately aligned initially and stay that way because there is no subsequent deformation due to heat treatment. The hard thread milling is performed by a method and apparatus including, in their preferred forms, use of a milling machining with a rotating tool holder carrying a plurality of radially disposed tool inserts with a cutting portion of a very hard material such as cubic boron nitride.

The invention provides an improved structure with more precise perpendicularity of the threads to the seal face than formerly and with the threads (like the seal face) having a higher finish and absence of residue (due to their milling after rather than before heat treatment) than other portions of the cavity surface that have not been machined after the heat treatment.

These and other aspects of the invention will be better understood from the following description.

BRIEF DESCRIPTION OF THE DRAWINGS

FIG. 1 is a cross-sectional view of an embodiment of a metal body, partly broken away, threadably retaining a solenoid valve in accordance with the invention;

FIG. 2 is a partial enlargement of FIG. 1 illustrating some aspects of the invention;

FIG. 3 is a view of an embodiment of milling equipment in accordance with the invention; and FIG. 4 is an enlarged view of an example of a tool insert for milling equipment such as that of FIG. 3.

DESCRIPTION OF PREFERRED EMBODIMENTS

Referring to FIG. 1, a generalized view of an embodiment improved by the present invention is shown. In this embodiment, the invention is applied to improve a body threadably securing a solenoid valve in a fuel injection system. FIG. 1 shows part of a metal body 10 including a cartridge cavity 12 threadably containing a solenoid valve 14. The cavity 12 has a bottom surface 16 with a opening or port 18 to a high pressure line 19 and a longitudinal wall or surface 20 with a lateral opening or port 22 to a low pressure line 23. Bottom surface 16 also has a center recess 17 for possible fluid accumulation which is not likely with the present invention.

The solenoid valve 14 is partially illustrated to schematically show examples of some internal features including passages 24 and 26 respectively in communication with the high and low pressure ports 18 and 22 of the body 10. Within the valve 14 is also shown in simplified form a valve pin or poppet 27 that is longitudinally movable between an open and closed position by electromagnetic action of a solenoid within the valve in accordance with well known practice. In the closed position, the end seal member of valve poppet 27 (shown in solid lines) fits against a valve seat 28 and prevents fluid flow between the high pressure and low pressure passages 24 and 26 of the valve 14. In the open position, the valve poppet (shown in dashed lines) is longitudinally moved to a position in which fluid flow between passages 24 and 26 is allowed. Terminal posts 29 are shown for connection with an electrical source.

A lower portion 30 of the valve 14, sometimes referred to as a valve guide, contains structure including passages 24 and 26. Correct location of the valve guide 30 is important for the passages 24 and 26 to meet the ports 18 and 22 in the body and not to allow leakage of fuel around the guide Consistent in part with past practice, valve guide 30 has a lower surface 31 with a recess 32 for a dowell 34 that also extends into a recess 36 in the bottom surface 16 of the cavity 12. Both the cavity 12 and the valve guide 30 are substantially cylindrical and the dowel 34 serves to orient the fluid ports and lines, but more is required. Here, as formerly, lower surface 31 of the valve guide and bottom surface 16 of the cavity 12 are sealed, including around the high pressure line in each, by a seal element or gasket 38.

Above the valve guide 30, a valve body portion 40 of the valve 14 has threads 42 that mate with threads 44 on the wall of the cavity 12 for securing the valve. Valve body portion 40 is rotatable in relation to the valve guide 30 that is held in place by the dowel 34.

To be able to withstand high pressures, such as about 20,000 pound per square inch, when the valve is closed, it is desired to have precise perpendicularity between the threads 44 and the bottom cavity surface 16. Cavity surface 16 is machined, by milling, to be true and flat and perpendicular to the center line of the cavity 12. The valve 14 can be readily commercially procured to have a precise perpendicular centerline and bottom surface, with the threads perpendicular to the bottom surface. In the past, although the cavity threads 44 were also intended to be perpendicular to the bottom cavity surface 16, that was not obtainable with as high precision as in the improvement of the invention.

In accordance with one aspect of the invention, a method of making a body, such as body 10, is employed that provides more precise perpendicularity between threads in a cylindrical cavity and the bottom of the cavity. With respect to the example product of FIG. 1, the body 10 may be, for example, a forging of a steel alloy, such as ANSI No. 4130 and modifications thereof. The method of the invention comprises the steps of heat treating the body 10 to provide it with a predetermined hardness, such as about Rockwell C 59-63 at its surface, by heat treatment to a temperature of about 900° C. The heat treatment may be performed by known processes as previously used for steel alloy bodies. Of particular significance to the present invention is the fact that the heat treatment is performed prior to any machining of threads 44 in the cavity surface 20 as well as machining of the lower cavity surface 16.

By way of further example, body 10 originates as a solid block of steel that is machined to form the basic configuration of cavity 12 while in the soft state, prior to heat treatment. The top of cavity 12 on the original form of body 10 is milled flat and then the cavity is drilled out establishing center line 12*a*. The seal face surface 16 is flattened and material is left so adequate dimensions remain when it is later hard milled. The longitudinal wall 20 is formed with undercutting as desired and with a region left for later hard milling of threads 44. The center recess 17 in the cavity surface 16 is counterbored. Low pressure port 22, including passage 23, is drilled (e.g., 6 mm). The dowell hole 36 is drilled. The high pressure port 18 is drilled (e.g., 2.5 mm). Then the body is hardened by heat treatment.

The method of the invention further comprises machining, after the heat treatment has been performed, both a planar seal face on the surface 16 and threads on the surface 20. The machining of the seal face on surface 16 is performed by milling in accordance with prior practice to produce a flat and true planar surface in the plane of line 16*a* of FIG. 1.

The machining, by milling, of the threads 44 after the heat treatment is a change from prior practice that requires some change of equipment to be performed satisfactorily. Further description of the process and equipment will be presented below. However, reference to FIG. 2 will be made now for further understanding of the results attained by the invention.

FIG. 2 shows the seal face represented by line 16*a*, surface 16 of the cavity 12, threads 44, as machined after heat treatment, and the cylindrical surface defined by the threads 44 which is represented by the line 44*a*. FIG. 2 shows line 44*a* passing through the midpoints of the threads 44 as determined by a gauge wire 46 wound between the threads. As shown, the line 44*a* meets the line 16*a* with an angle "a" equal to 90°. The seal face 16 is also in perpendicular relation to the center line 12*a* of cavity 12; angle "b" also equals 90°.

In practice, the invention provides greater precision by a factor of five. Formerly, with threads 44 for securing valve 14 milled before heat treatment, there was a total maximum indicated runout of 0.05 mm between the threads and the seal face, as determined by standard engineering techniques. With the inventive technique, precision to less than 0.01 mm is attained. (The distance of the threads 44 to the seal face 16 is about 25 mm, for example.)

Another preferred aspect of the invention shown in FIG. 2 is that the threads 44 each have blunt tips. This reduces the risk of tip breakage which can create debris that can throw the valve 14 out of concentric alignment in the cavity. Additionally, the threads 44 are each uniform in cross section. That is, the threads preferably have a uniform cross section throughout, with no start or end portions of reduced cross-section. This also helps to minimize breakage.

Body 10 may additionally include, in portions not illustrated, portions for a tappet tower and a plunger bore in accordance with known practice in electronically controlled fuel injection equipment.

Copending application Ser. No. 779,295, filed Jan. 6, 1997, by Myers et al., assigned to the assignee of the present invention, contains further description of thread configurations and of fuel injector apparatus applicable to some embodiments of the present invention and such application is herein incorporated by reference.

The invention also has application to precise threaded securing of components in a metal body other than in the example of FIGS. 1 and 2.

In the practice of the method of the invention, the machining of the threads 44 is preferably performed by a milling machine with a rotating tool holder 50 such as is illustrated in FIG. 3. The tool holder carries at least one, preferably more than one, radially disposed tool inserts 52, each having a cutting portion 54 of metal cutting material. In this example, the holder 50 has two tool inserts 52 extending radially substantially opposite each other. Another embodiment may have four tool inserts 52 about 90° apart. FIG. 4 shows a single insert 52.

Because of the hardness of the heat treated metal of body 10, the cutting material of portions 54 has a hardness substantially equal to that of diamond. For example, cubic boron nitride (CBN) has been found quite suitable for use as the cutting material. CBN is a known machining material but due to concerns about brittleness, particularly when not subjected to continuous loading, has not been previously applied for hard milling of internal threads in apparatus such as that of FIG. 1. However, it has been found to be quite satisfactory for the purposes of the invention even though use in such an application is contrary to past practice. For example, machining of planar surfaces, such as seal face 16*a*, in hardened metal by CBN tools has been previously performed for a considerable time during which CBN tools for hard milling threads have been avoided.

In milling the threads 44, the tool head 50 is rotated and moved, such as by milling operation control equipment 60, in a circle concentric with the axis of the cavity 12 in a generally known milling technique of circle interpolation. During the rotation and circle interpolating the tool holder is advanced longitudinally at a predetermined rate. The axis of rotation of the tool head 50 is maintained parallel to the centerline 12*a* of the cavity 12. Milling operation control equipment 60, only schematically shown, may comprise a motor and control components generally in accordance with past practice but in a configuration, such as by programming of numerical control components, for performing the motions required for the present application.

The use of multiple tool inserts helps to speed up the cutting of the threads. Also, as shown more clearly in the view of the tool insert in FIG. 4, the tool cutting portion has multiple teeth to facilitate faster machining. The number of teeth on the insert may, for example, exceed the number of threads because body 10 is initially formed with a land of less diameter in the cavity wall for formation of the threads.

The thread milling is performed on the body 10 after it has cooled down from the heat treatment.

During the thread milling no coolant needs to be applied to the cutting elements.

Once the threads are formed by the milling operation, they are not subjected to any further heat treatment that would cause any deformation of the threads. Therefore, they can be relied on to retain the precision perpendicularity they were originally formed with.

The control of the milling equipment during the thread milling may be performed by having a motor, or other motive power source, applied to the tool holder with control, such as by numerical control techniques, of the speed of rotation, the circle interpolation, and advancement of the tool holder. In this way, the cutting can be completed as rapidly as reasonably possible with a long tool life.

INDUSTRIAL APPLICABILITY

The invention provides improved techniques for precision location of a cylindrical component in a metal body. While described in the context of valves in fuel injector bodies, it is apparent that its application is not limited thereto.

The quality of the product is improved by more precise perpendicularity. In the example embodiment, the precise perpendicularity of the threads 44 in relation to the seal face 16*a* insures against the valve 14 being out of alignment and leakage occurring around the valve 14 from the high pressure port 18 of body 10. Also, it will be seen on examination that the threads milled after heat treatment have a higher finish and are free of residue, such as metal particles, heat treat scale, and the like, then at the remaining portions of the cavity surface that has not been machined after heat treatment.

Further variations will be apparent within the reasonable scope of the claimed invention.

What is claimed is:

1. A method for making a body with a cartridge cavity for threadably retaining a fuel injector solenoid valve having a valve guide surface fitting against a planar seal face at an end of the cavity, comprising the steps of:

machining, prior to heat treatment, a block of metal to include an initial cavity with a substantially cylindrical configuration without threads;

heat treating the body only after said machining of the initial cavity, and before any machining of threads, to provide it with a predetermined hardness;

machining, after said heat treating, the planar seal face at the end of the cartridge cavity, and;

machining, also after said heat treating, threads on a longitudinal cavity surface, wherein the threads are aligned perpendicular to the seal face and so remain for threadably retaining the fuel injector solenoid valve.

2. The method of claim 1 wherein:

the machining of the threads is performed by a milling machine with a rotating tool holder inserted within the cavity, said holder carrying at least one radially disposed tool insert comprising a cutting portion of metal cutting material having a hardness substantially equal to that of diamond.

3. The method of claim 2 wherein:

the machining of the threads is performed by said rotating tool head carrying a plurality of said radially disposed tool inserts, the cutting portions of each of the inserts each having a plurality of thread cutting teeth of the metal cutting material which consist essentially of cubic boron nitride.

4. The method of claim 3 wherein:

the machining of the threads is performed by rotating and circle interpolating the tool head.

5. The method of claim 1 wherein:

the body consists essentially of a steel alloy and the heat treating is performed to the predetermined hardness of about Rockwell C 59-63 at the body's surface.

6. The method of claim 5 wherein:

the heat treating is performed at an elevated temperature and is followed by cooling the body prior to machining the threads.

7. The method of claim 6 wherein:

the heat treating is performed at a temperature of about 900° C.

8. The method of claim 5 wherein:

the machining of the threads is performed by a milling machine with a rotating tool holder inserted within the initial cavity and the rotating tool holder carries radially disposed tool inserts with a cutting material consisting essentially of cubic boron nitride.

9. The method of claim 8 wherein:

the machining of the threads is performed without subsequent heat treatment and to an extent to make the threads have a higher finish than other portions of the cavity not machined after heat treatment, and further comprising following said machining of the threads, and without any subsequent heat treatment, rotatably threading a valve guide of a solenoid valve into the machined threads in the cavity.

* * * * *